United States Patent [19]
Medley

[11] Patent Number: 4,872,702
[45] Date of Patent: Oct. 10, 1989

[54] SUSPENSION SYSTEM FOR VEHICLES

[75] Inventor: Jackson C. Medley, Brimfield, Ill.

[73] Assignee: Kress Corporation, Brimfield, Ill.

[21] Appl. No.: 235,109

[22] Filed: Aug. 23, 1988

[51] Int. Cl.⁴ ............................................. B60G 11/26
[52] U.S. Cl. .................................... 280/708; 280/707; 267/64.16
[58] Field of Search ................ 188/319, 299; 280/701, 280/706, 707, 708, 840; 267/64.16, 64.17

[56] References Cited

U.S. PATENT DOCUMENTS

| | | | |
|---|---|---|---|
| 3,820,818 | 6/1974 | Kress et al. | 280/96.2 R |
| 4,326,733 | 4/1982 | Rubalcava | 280/708 |
| 4,625,994 | 12/1986 | Tanaka et al. | 280/708 |
| 4,723,640 | 2/1988 | Beck | 280/707 |
| 4,726,453 | 2/1988 | Obstfelder et al. | 280/707 |
| 4,753,328 | 6/1988 | Williams et al. | 280/707 |
| 4,773,672 | 9/1988 | Deroche | 280/708 |

OTHER PUBLICATIONS

Hydrair II Suspension, pp. F-2 through F-17 (Believed to be from 1974–1975 time period).
Drg. No. 033-M-310/1; Mining Equipment 3200 Haulpak Truck Arrangement (36.00×51.00 tyres) (Approximately 1974–1975).
Drg. No. 033-M-328/; Mining Equipment 3200 Haulpak Truck Rear Suspensions and Accumulator Install Details (Approximately 1974–1975).
Wabco Model 3200B Electric Haulpak Truck specification sheet (Believed to be from 1974–1975 time period).

Primary Examiner—Richard A. Bertsch
Attorney, Agent, or Firm—Leydig, Voit & Mayer

[57] ABSTRACT

An improved suspension assembly for a high capacity hauling vehicle having a strut that is connected to a two-chamber cylinder or accumulator. The strut has a first section that is connected to the axle and a second section which is secured to the vehicle chassis and telescopes in relation to the first section. Further, the strut has a chamber that contains a gas and a liquid. The suspension assembly accumulator has two chambers that are separated by a movable piston. The first accumulator chamber is filled with liquid while the second accumulator chamber is filled with a gas. The gas-filled accumulator chamber is connected to the strut chamber, which also contains gas, by way of a hose which includes a fixed size orifice. The orifice is sized to regulate the flow of gas between the chambers so that the dynamic stiffness characteristic of the strut varies as a function of the speed of the movement of the axle relative to the vehicle. The liquid filled accumulator chamber is connected to a source of liquid under pressure so that the volume of liquid in the accumulator may be varied. A self-leveling feature senses the relationship of the axle to the vehicle to automatically level the vehicle. The operator of the vehicle may manually override this feature to raise or lower the vehicle body upon command.

8 Claims, 5 Drawing Sheets

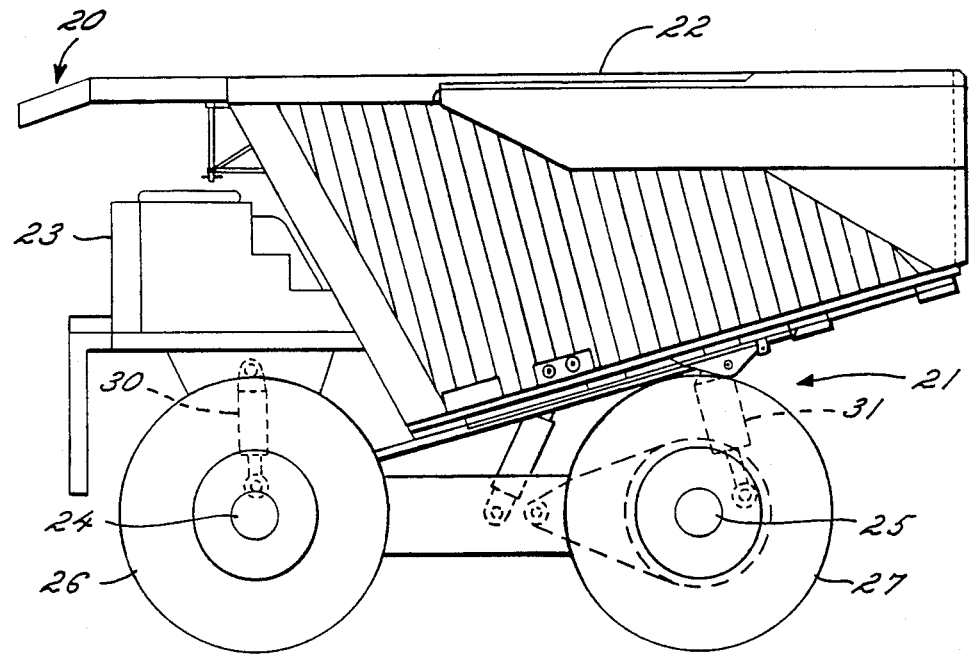
FIG. 1 (PRIOR ART)
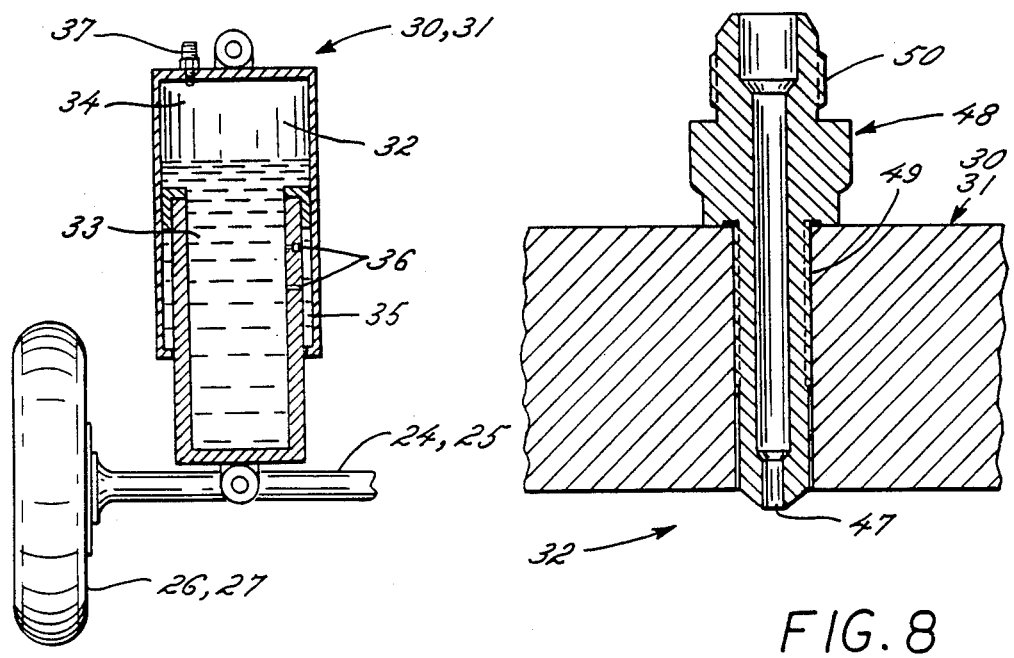
FIG. 2 (PRIOR ART)
FIG. 8

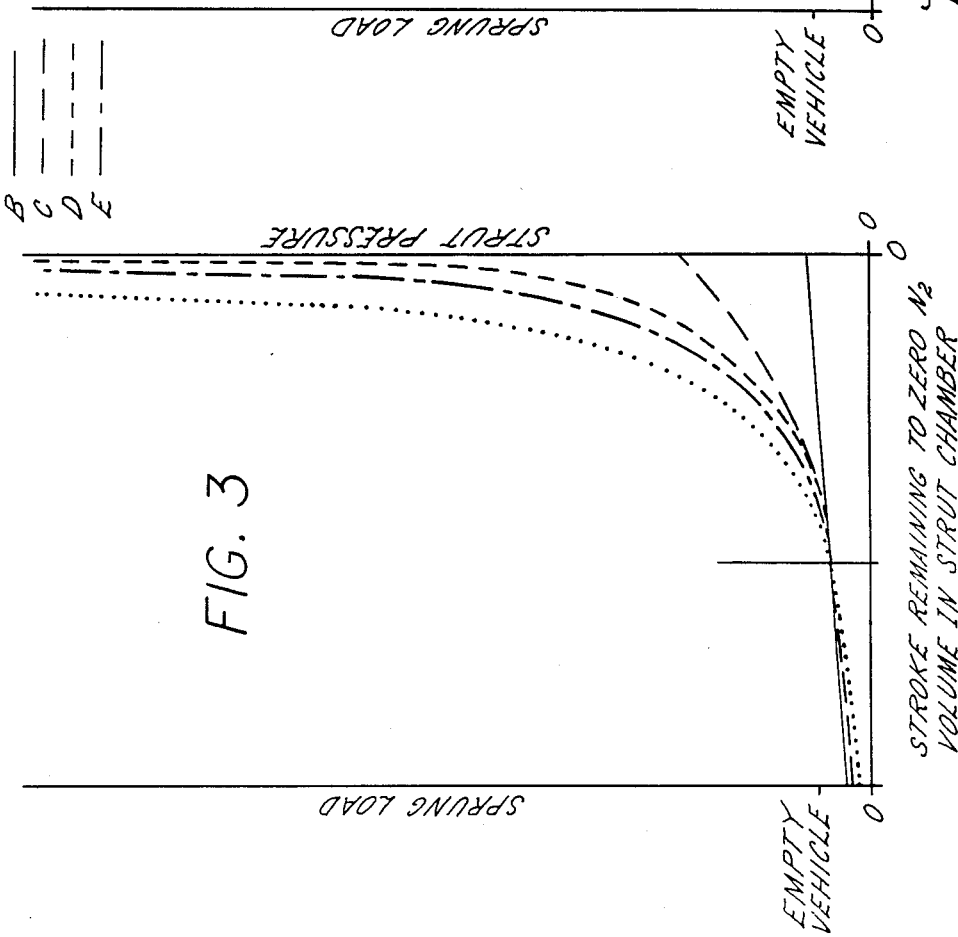

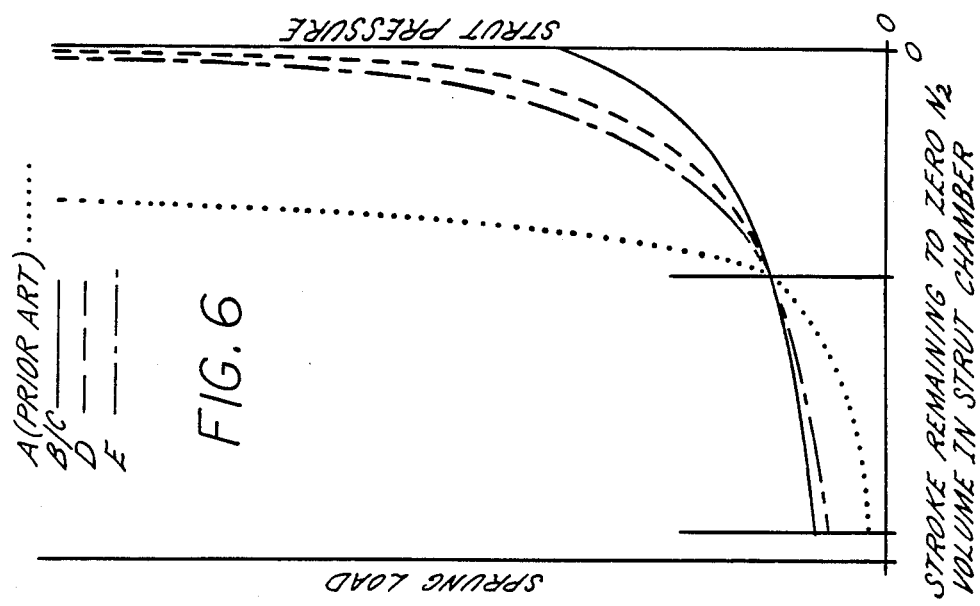
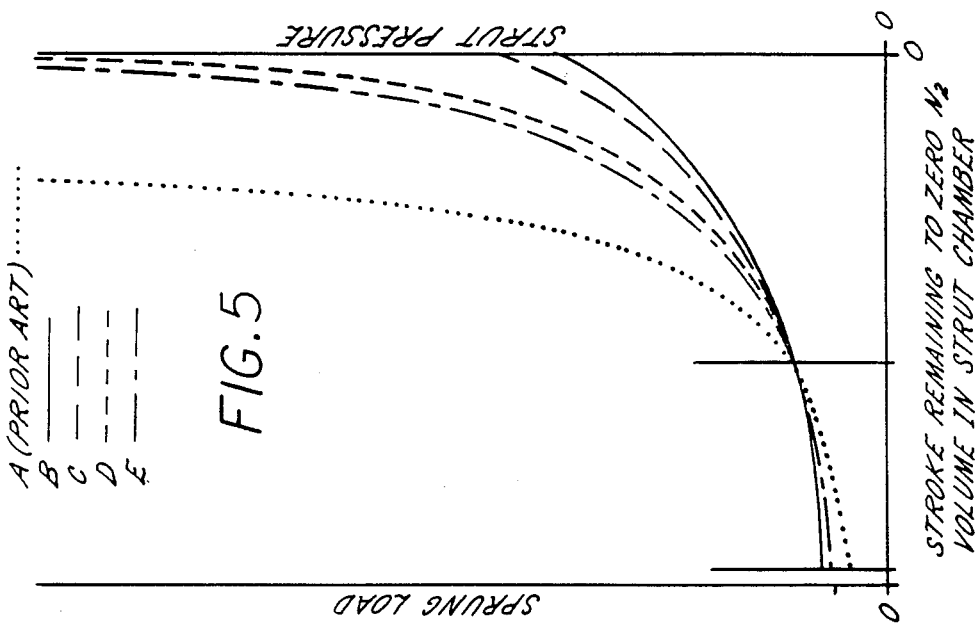

SUSPENSION SYSTEM FOR VEHICLES

FIELD OF THE INVENTION

The present invention relates generally to high capacity hauling vehicles and more particularly concerns suspension arrangements for such vehicles.

BACKGROUND OF THE INVENTION

As high capacity hauling vehicles have high loaded weight requirements and function on very rugged terrain, they present suspension problems different from those encountered in more conventional vehicles. The vehicle payload may vary by hundreds of tons. As a result, the suspension must support a wide range of weight.

In order to permit economic component geometry for efficient vehicle packaging, the total suspension stroke must be relatively short. Due to such vehicle space restrictions, these high capacity vehicles commonly utilize so-called "uncompensated" hydropneumatic suspension systems. In an uncompensated system, the volumes of fluid and mass of gas in each suspension strut remain constant. Consequently, to prevent the unit from bottoming out with road inputs in a loaded vehicle, the suspension must become rapidly stiffer as the weight supported increases. As a result, conventional uncompensated suspension systems typically are characterized by poor ride quality and high frame stresses due to load and road inputs. Because a large number of heavy duty vehicles with uncompensated suspension systems are currently utilized in bulk moving operations such as strip mining, it is desirable to develop a method to modify these field vehicles to improve such characteristics. Likewise, such a system would be advantageous in new vehicles where the vehicle design restricts the dimensions of the suspension package.

OBJECTS AND SUMMARY OF THE INVENTION

It is the primary aim of this invention to provide an improved suspension system for high capacity hauling vehicles which improves the ride characteristics of the empty and loaded vehicle and reduces the resulting vehicle frame stresses. It is a more specific object to provide a system in which there is minimal degradation in driving comfort when cargo is added to the vehicle.

Another object is to provide vehicle leveling control through a flexible suspension design by which the vehicle body may be maintained at the same height, irrespective of the load. A further object is to provide a method by which the operator may adjust the vehicle ride height at will, or the ride height may be automatically adjusted through a series of control mechanisms. Related objects are to provide quick suspension system adjustment to changes in load, and safe operation by remote control of the suspension components.

An additional object is to provide an economical method of improving the ride characteristics of vehicles currently equipped with uncompensated suspension systems to allow easy modification of the suspension without major down time.

It is a more detailed objective to provide a method by which currently uncompensated systems may be modified in the field to provide specified ride characteristics. More particularly, the modified suspension system provides the axle supporting each wheel with a two-chamber strut containing a compressible gas and an incompressible fluid in the respective chambers. Further, the invention adapts each strut with a two-chamber cylinder or accumulator that likewise contains a compressible gas and an incompressible fluid in respective chambers. A conduit with an orifice therein connects the gas chambers of the strut and the cylinder and regulates the flow of gas between the chambers to control the speed of the movement of the axle in relation to the vehicle. More specifically, on a normally undulating road with a long frequency period input, the gas flows through the orifice between the chambers at a moderate but constant volumetric unit rate to provide a long suspension stroke which results in soft ride characteristics. When the vehicle encounters abrupt bumps while moving rapidly, the orifice limits the flow of gas between the chambers at essentially the same moderate, but constant volumetric unit rate. Thus, there is an increase in the dynamic stiffness characteristic of the suspension system, which prevents the suspension system from bottoming.

These and other features and advantages of the invention will be more readily apparent upon reading the following description of a preferred exemplified embodiment of the invention and upon reference to the accompanying drawings wherein:

BRIEF DESCRIPTION OF THE DRAWINGS

FIG. 1 is a side elevation of a vehicle showing the position of suspension struts according to the prior art.

FIG. 2 is a rear view of a conventional hydropneumatic suspension strut mounted on a vehicle axle according to the prior art.

FIG. 3 is a graph of the suspension characteristics of the front suspension in an empty vehicle, both according to the prior art and according to the instant invention.

FIG. 4 is a graph of the suspension characteristics of the rear suspension in an empty vehicle, both according to the prior art and according to the instant invention.

FIG. 5 is a graph of the suspension characteristics of the front suspension in a loaded vehicle, both according to the prior art and according to the instant invention.

FIG. 6 is a graph of the suspension characteristics of the rear suspension in a loaded vehicle, both according to the prior art and according to the instant invention.

FIG. 8 is an enlarged fragmentary section of a flow restricting orifice according to the instant invention.

Figure 7:
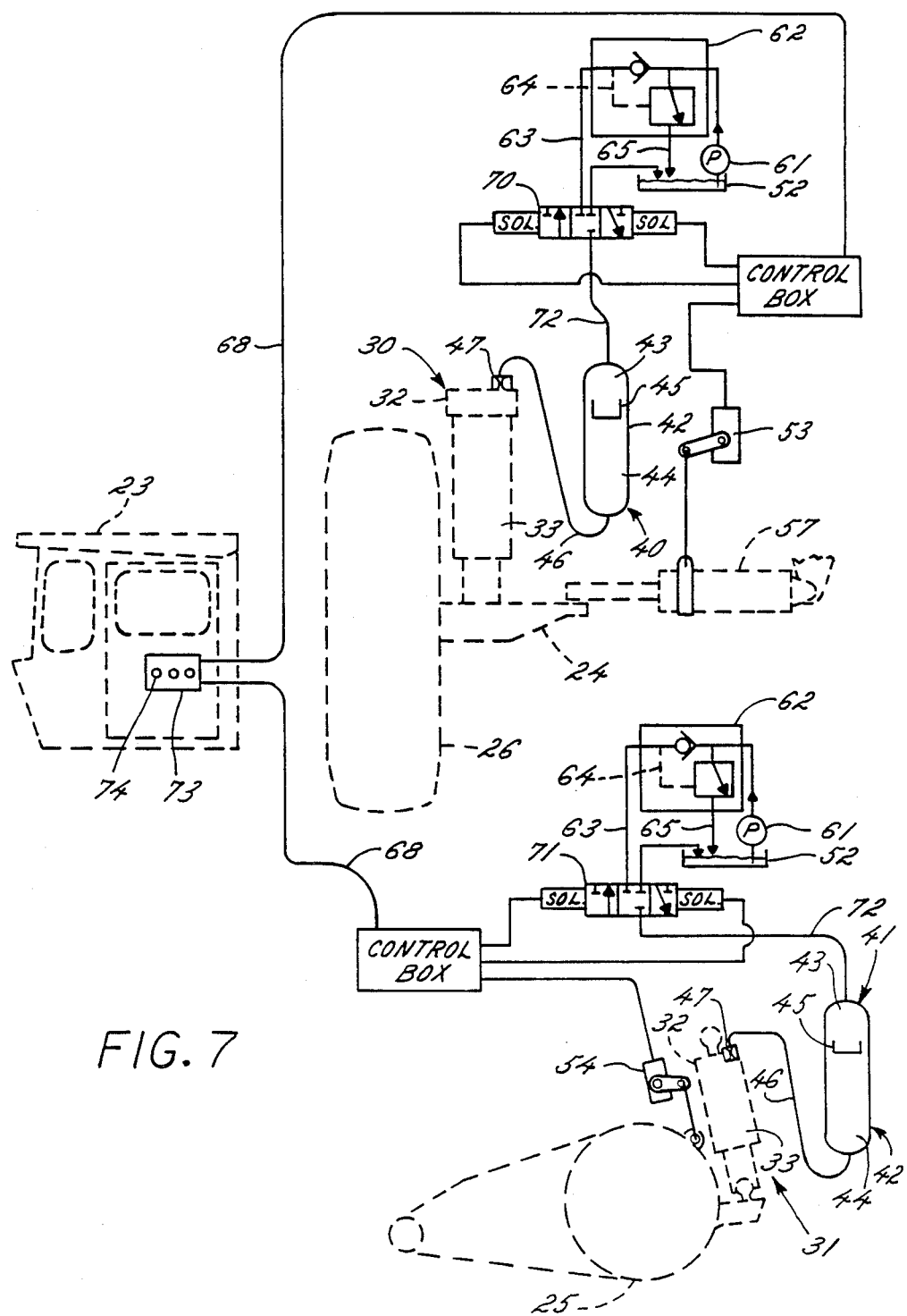
FIG. 7 is a schematic and hydraulic diagram of a portion of the control system embodied in one side of the vehicle of FIG. 1.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENTS

Turning now to the drawings, FIG. 1 shows a carrier vehicle 20 having a chassis 21 upon which a body 22 and an operator's cab 23 are supported. The chassis 21 is supported on the axles 24, 25 of the front and rear ground wheels 26, 27 by a suspension system that includes front and rear struts 30, 31. The struts 30, 31 may be of the direct-acting type being pivotally connected to the axle 24, 25 or wheel control link at one end, and similarly connected to the frame of the chassis 21 at the other end. The struts 30, 31 may be single acting hydraulic cylinders, such as illustrated in FIG. 2, having a chamber 34 containing a compressible gas 32, such as nitrogen, and an incompressible hydraulic fluid 33, such as oil. The struts 30, 31 may also have an additional chamber 35 for incompressible fluid which may vary in volume as the strut 30, 31 telescopes during operation. Fluid flow between the chambers 34, 35 in the strut 30, 31 is achieved through valve controlled passages 36 to permit telescoping motion of the strut 30, 31. Alternately, the struts 30, 31 may be of the conventional hydropneumatic type with the gas 32 and fluid 33 contained in two or more chambers separated by a rubber diaphragm, a moveable piston, or the like (not shown). One skilled in the art will appreciate that the configuration shown in FIG. 2 is given by way of illustration and not limitation. The struts 30, 31 are charged or filled through fluid and gas charge valves 37 with sufficient volumes of fluid and gas in order to achieve a specified strut ride height. In the embodiment illustrated in FIGS. 1 and 2, the struts 30, 31 are "uncompensated" as the total volumes of fluid and gas contained within the chambers of the strut 31, 32 do not vary as the vehicle 20 encounters an input force as the vehicle moves down the road or the body 22 is loaded.

In accordance with the present invention, each strut is modified into a so-called "compensated" strut by the addition of an external variable-volume accumulator that allows the volume of gas in the strut to be varied. According to an important aspect of the invention, an orifice regulates the flow of gas between the accumulator and the gas chamber of the strut to control the movement of the axle relative to the vehicle.

Describing the system in more detail, the accumulator has two chambers separated by a floating piston portion, a diaphragm, or a rubber bladder within the accumulator cylinder. One chamber of the accumulator contains a gas and is connected to the strut, while the other chamber contains an incompressible liquid and is connected to a source of liquid under pressure. A valve mechanism controls the supply of liquid from the source to the accumulator chamber to permit adjustment of the volume of liquid in the accumulator. An orifice controls the flow of gas between the gas chamber of the accumulator and the chamber of the strut which contains gas. The orifice regulates the flow of gas such that the resulting dynamic response characteristics of the strut may be defined. As a result, an "uncompensated" suspension system may be "compensated" by the addition of an external device so that the system will achieve desired performance characteristics.

To permit economic component geometry in a conventional uncompensated suspension system, the total suspension stroke must remain relatively short. In order to prevent a strut from bottoming out when the vehicle accelerates or encounters road inputs, the spring rate of an uncompensated strut increases rapidly as the load is added to the empty vehicle. The performance characteristics of a conventional uncompensated suspension strut without the adaption of the invention are illustrated in FIGS. 3-6 as curve A. FIGS. 3-6 show the static and dynamic characteristic curves for an empty and loaded vehicle for both the front and the rear struts. In FIGS. 3-6, the left vertical axis represents the increasing sprung load on the strut. The horizontal axis reflects the decreasing stroke of the strut remaining until the volume of gas in the strut chamber is at zero. As the sprung load on the strut increases and the corresponding stroke of the strut remaining diminishes, the strut gas pressure increases, as shown on the right vertical axis.

The determination of the natural frequency of the suspension at normal ride position is a method of evaluating the ride acceptability of the vehicle. A low natural frequency generally indicates an acceptable ride with corresponding low shocks, while a high natural frequency generally indicates a harsh ride. Referring again to FIGS. 3-6, the steeper the ascension of the performance curve, the higher the "instant" natural frequency and the more severe the acceleration of the sprung mass at any given point on the curve. Moreover, in FIGS. 3-6, the area below each performance curve represents the total energy absorbed during any given excursion distance. The shorter the distance to absorb the energy, the higher the shock transmitted to the chassis 21 for any given amount of energy absorbed. As the shock transmitted increases, ride unacceptability and resulting frame stresses likewise increase. Thus, curve A representing the uncompensated suspension characteristics indicates a harsh vehicle ride for both the empty and loaded excursions of the front suspension (FIGS. 3 and 5), and the loaded excursions of the rear suspension (FIG. 6).

In order to improve ride acceptability by lowering the natural frequency of the suspension at normal ride position and decreasing the amount of shock transmitted for a given amount of energy absorbed, it is desirable to increase the stroke of the strut. To provide an increased constant stroke when the load is varied, the suspension is upgraded or "compensated." To this end, more mass is added to the spring or strut 30, 31 by means of an external variable volume reservoir or accumulator 40, 41, as shown in FIG. 7. It will be appreciated that the schematic of FIG. 7 illustrates the upgraded suspension components and that their approximate location for only one side of the vehicle, as the suspension components for opposite side of the vehicle are duplicative of the components shown. In a preferred embodiment, the accumulator is a cylinder 42 which has two chambers 43, 44 separated by a floating piston 45. One cylinder chamber 43 contains oil or a similar incompressible fluid. The other cylinder chamber 44 contains a compressible gas, such as nitrogen, as is contained in the strut 30, 31. While the chambers 43, 44 are separated by a floating piston 45 in the embodiment shown, one skilled in the art will appreciate that the chambers 43, 44 may alternately be separated by a diaphragm, or a rubber bladder, or the like (not shown) as the configuration shown is given by way of illustration and not limitation.

In order to provide a flow of nitrogen between the strut 30, 31 and the gas chamber 44 of the accumulator 40, 41, a line 46 connects the chamber 34 of the strut 30, 31 which contains the gas 32 with the gas chamber 44 of the accumulator 40, 41. If this line 46 allowed free flow of nitrogen between the two chambers 34, 44, as the strut encountered an input force, nitrogen would rapidly transfer from the chamber 34 of the strut 30, 31 into the chamber 44 of the accumulator 40, 41. Such unrestricted flow would result in the strut 30, 31 bottoming out, and an unacceptably harsh input to both the chassis 21 and the driver.

In order to maintain the additional stroke without permitting such bottoming out, the invention utilizes an orifice 47 to regulate the gas flow between the chambers 34, 44. In this way, and according to accepted principles of operation of orifices, when the gas pressure is greater than about 15 psig, the high pressure volume of gas discharged through the orifice 47 is substantially independent of pressure. As a result, the gas flow between the chambers 34, 44 occurs at a substantially constant rate depending on the orifice 47 size and the orifice coefficient. It will be noted that the dimensions of the orifice 47 may be tailored so that the orifice coefficient will depend upon the direction of flow. Further, the volumetric flow rate will depend upon the direction in which the gas flows between the two chambers 34, 44. In an alternate embodiment, the orifice 47 characteristics could be approximated by a device utilizing a check valve and preset directional valves (not shown). In this way, the addition of suspension stroke by means of an orifice 47 or other device which regulates gas flow to and from the external variable volume accumulator 40, 41 results in more desirable performance characteristics while preventing the suspension from bottoming out with sudden inputs. Moreover, the orifice 47 design parameters allow design flexibility in order to achieve specified dynamic performance characteristics.

It is known that, for pressures greater than 15 psig, the volume of high pressure gas discharged through the orifice is independent of pressure, as represented by the following equation:

$$V = \frac{(Constant)(a)(C)}{\sqrt{T}}$$

In this equation, the letter "V" represents the volumetric flow of the higher pressure gas through the orifice in cubic inches per second. The letter "a" represents the cross sectional area of the orifice in square inches. The letter "C" represents the orifice coefficient in a particular direction. The letter "T" represents the absolute temperature of gas in the high pressure gas chamber. The "constant" for calculation purposes is 179,750. By way of specific example, for an orifice diameter of 0.125 inches, with an orifice coefficient of 0.65, and an absolute temperature of 560 degrees Fahrenheit, the volume of higher pressure gas expelled through the orifice would be 60.558 cubic inches per second. For the same orifice dimensions and temperature, if the orifice has an orifice coefficient of 0.90 in the opposite flow direction, the resulting volumetric flow rate would be 83.849 cubic inches per second. In this way, regardless of the specific pressure achieved in excess of 15 psig within struts 30 and 31, a predictable gas flow rate between the chambers 32, 44 may be calculated to design specific suspension performance characteristics, such as those shown in FIGS. 3-6.

In accordance with the invention, FIG. 8 illustrates an orifice 47 through an orifice fitting 48 secured in a wall of the chamber 34 of the strut 30, 31. It will be appreciated that the orifice 47 and orifice fitting 48 shown represent only one possible design and that the specific configuration and dimensions of the orifice 47 are parameters that may be varied in order to yield desired system performance results. In order to assemble the orifice fitting 48 in the strut 30, 31, the fitting 48 is provided with threads 49 that mate with corresponding threads in the strut wall. In this way, the orifice fitting 48 may be secured in the existing opening in the strut wall for the gas charge valve 37 (FIG. 2) or in an opening specifically designed to accept the fitting 48. Likewise, the fitting 48 is provided with threads 50 which mate with the fitting of line 46 to the gas chamber 44 of the accumulator 40. In this way, the orifice 47 provides a means by which the flow of gas between the accumulator gas chamber 44 and the strut chamber 34 may be regulated to define the strut's (30, 31) specific dynamic performance results.

It will be appreciated that the curves of FIGS. 3-6 illustrate only representative static and dynamic figures, as the actual results will vary based upon the dimensions of the orifice 47 and the orifice coefficient. Curve B represents the static deflection performance of the upgraded strut. Curves C, D, and E represent the dynamic performance of the upgraded strut as deflected at increasing speeds, curve E representing an infinitely fast deflection time. In viewing the curves, one skilled in the art will appreciate that the dynamic stiffness characteristic varies as a function of the speed of the excursion in the upgraded strut. In this way, the invention yields a suspension system with a very soft spring rate for slow deflections, while it prevents the suspension from bottoming as a result of rapid excursions, even with the relatively short maximum compression stroke mandated by vehicle space restrictions.

As shown in FIGS. 3, 5 and 7, as the stroke for a given input load increases, the resulting performance curve (curves C, D, E) will remain flat for a longer stroke distance and then ascend less steeply than for the uncompensated strut (curve A). This is likewise true for the static performance curve B and the dynamic performance curve C for long frequency period excursions of the rear suspension in an empty vehicle, as shown in FIG. 4. In this way, the upgraded suspension system displays a lower instant natural frequency and reduces the amount of shock transmitted for a given amount of energy absorbed. More specifically, as shown by curve C, on a normally undulating road with a long frequency period, the response curve approaches a static displacement versus load curve as illustrated by curve B in FIGS. 3-6. This result is most evident in FIG. 6 in which the static deflection performance (curve B) and the dynamic performance for long frequency period excursions (curve C) of the loaded rear suspension are reflected by the same curve, designated curve B/C. In this way, the suspension system responds to low frequency inputs with a soft spring rate.

As the speed of the dynamic input increases, as illustrated by curve D and further curve E in FIGS. 3-6, the response curves ascend more rapidly to protect against "bumping." As illustrated by curve E in FIGS. 3, 5, and 6, when a rapidly moving truck encounters abrupt bumps, the response curve approaches an infinitely rapid curve, yet results in a longer stroke than the uncompensated suspension system for an equal area under the curve. Thus, the increased energy absorption capacity during a given excursion of the upgraded strut results in less shock to the driver.

While curves D and E for the upgraded rear suspension excursion in the empty vehicle ascend more rapidly than the existing strut (curve A, FIG. 4), the performance curves A through E shown in FIGS. 4 and 6 demonstrate the flexibility of the design parameters of the invention. Due to the use of a fixed orifice, desirable characteristics for the rear strut excursion in the empty vehicle are attained by optimizing such design parameters as the normal ride stroke, the connected reservoir volume, and the orifice size and design. In this way, the design parameters of the rear suspension strut are tailored to provide more lateral roll stability in the empty vehicle than previously supplied by the uncompensated strut.

Returning now to FIG. 7, in order to provide the upgraded system with additional flexibility, the pneumatic accumulator 40, 41 is hydraulically operated. To this end, the oil chamber 43 of the accumulator 40, 41 is provided with a source 52 of incompressible fluid. The volume of incompressible fluid in the oil chamber 43 of the accumulator 40, 41 may thus be varied by way of a system of control devices to further define the size of the gas chamber 44 of the accumulator 40, 41. In order to detect the relationship of the body 22 and cab 23 to the axles 24, 25, position sensors 53, 54, are provided. The position sensors 53, 54 each contain a double throw switch 55, 56 or a similar sensing device. The front position sensors 53 are mounted to sense the vertical spacing of the front axle 24 from the vehicle body 22 and cab 23. In the embodiment shown, the position sensors 53 are conveniently mounted to the steering cylinder 57 to detect this vertical movement. Similarly, the rear position sensors 54 are mounted to sense the vertical spacing of the rear axle 25 to the vehicle body 22. In this way, the actuation of the switches due to the change in vertical relationship of the vehicle body 22 and cab 23 to the ground will cause hydraulic fluid to be added or removed from the accumulator 40, 41 in order to maintain a specified ride height, irrespective of the load. While the following explanation may refer to a single strut, accumulator, and control system, the reader will appreciate that the explanation refers to each individual wheel and corresponding strut, accumulator, and control system.

As shown in FIG. 7, during operation, the accumulator 40, 41 is kept charged by a pump 61 from the fluid source 52 through a pressure control valve 62 and line 63. When the pressure in the accumulator 40, 41 reaches the level for which the valve 62 is set, that pressure, acting through a passage 64, opens the output of the pump 61 to the source 52 through a line 65.

Figure 9:
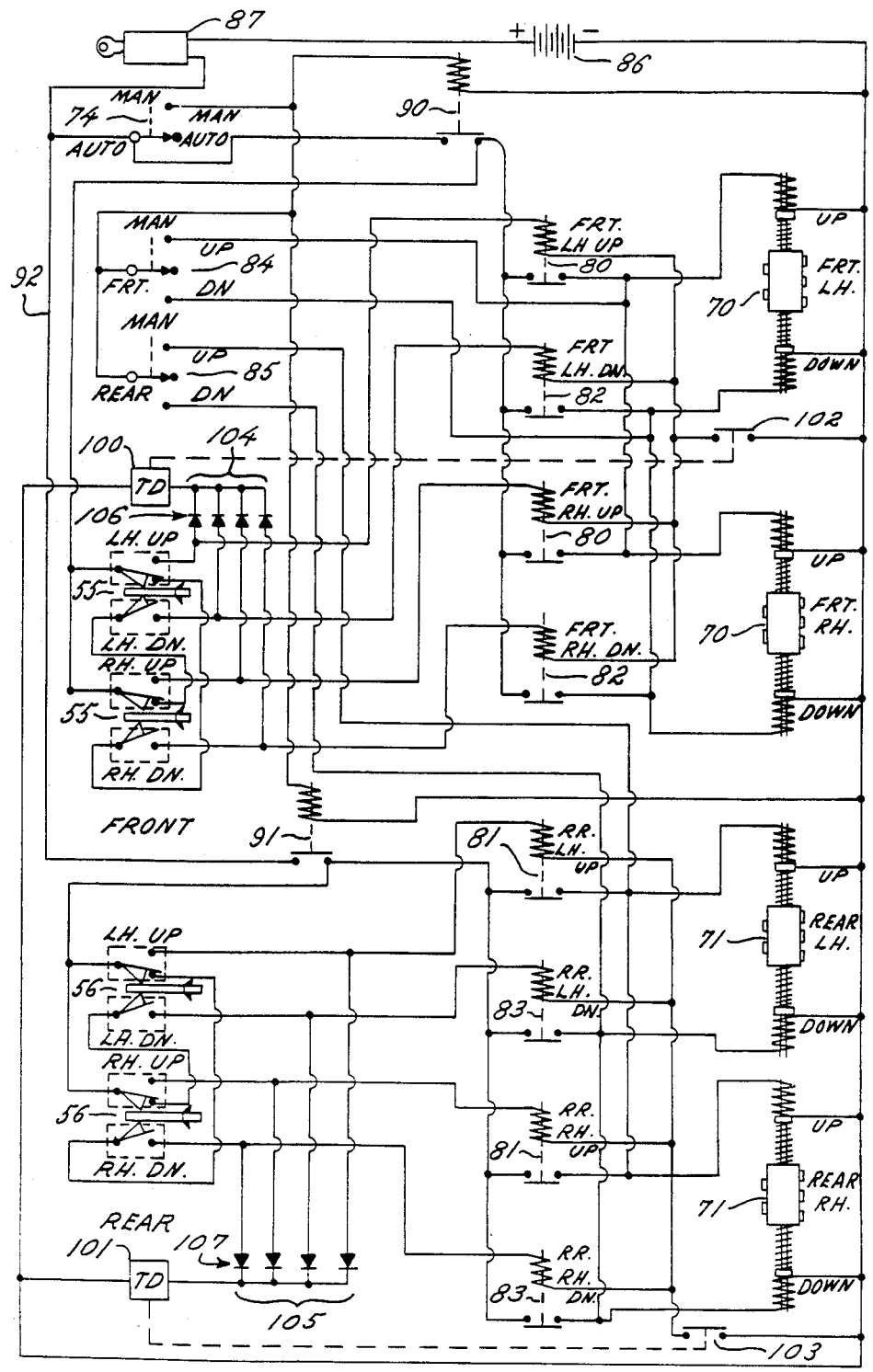
FIG. 9 is an electrical schematic of a portion of the control system embodied in the vehicle of FIG. 1.

Oil is added to the accumulator 40, 41 through three-way solenoid operated valves 70, 71 via lines 63, 72 from the source 52. The valve 70, 71 can be operated either manually, so that the operator may add or remove oil from the accumulator 40, 41 at will, or the same operation may be performed automatically. The operator in the cab 23 may determine the method of operation at the control panel 73 via the mode selection switch 74. As shown in FIG. 9, each of the valves 70, 71 is controlled by an up relay 80, 81 and a down relay 82, 83 as well as a manual switch 84 for valves 70 and a manual switch 85 for valves 71. The circuit is energized from a source 86 through a key switch 87.

When the mode selection switch 74 is in the automatic position as illustrated in FIG. 9, the contacts of control relays 90, 91 are closed. Closing the contact for the relay 90 provides power to up and down relays 80, 82 and the switches 55 for the front valves 70. Likewise, closing the contacts for the control relay 91 provides power from the line 92, to switches 56 and up and down relays 81, 83 for the rear valves 71. Operation of switches 55 or 56 in either the up or down direction energizes the associated up or down relay 80, 82, 81, 83 associated with control valves 70, 71 so as to operate the valves in appropriate direction.

When the mode selection switch 74 is set for automatic operation of the front and rear valves 70, 71, some range of motion before the switches 55, 56 are activated is desirable. To this end, time delay relays 100, 101 are provided which prevent compensation of the system when normal travel vibrations, road bumps, and other transient conditions are encountered. Because the relays 100, 101 may be set to a desired time period, the relays 100, 101 cause the system to be compensated when an input is sustained over a longer period of time. In this way, since the system does not respond to short, unsustained inputs, the time delay relays 100, 101 conserve energy required to compensate the system by pumping oil into the oil chambers 43 of the accumulators 40, 42. The time delay relays 100, 101 are provided with normally open contacts, 102, 103 interposed in the line from the power source 86 which energizes one side of the up and down relays 80, 82, 81, 83 for each of the valves 70, 71. A relay 100, 101 is picked up when energized through one of the lines 104, 105, respectively, for a given time period. In a preferred embodiment of the invention, the time delay 100, 101 would be set such that no subsequent position compensation would be made unless an excursion lasted for a period exceeding, for example, something on the order of four seconds. Such an excursion could occur during a long sweeping, high-speed turn when the truck would tend to lean due to centrifugal force; as a results after four seconds compensation would commence that would laterally level the truck. Any change in payload would be compensated in a similar manner. The lines 104 direct current to the relay 100 through one of a set of diodes 106 whenever either switch 55 is moved to either the up or down actuated position. Likewise, the lines 105 direct the current to the relay 101 through one of a set of diodes 107 whenever either switch 56 is moved to either the up or down actuated position. Thus, the switches 55, 56 must remain operated for a minimum of four seconds before the associated one of the relays 80, 82, 81, 83 will be picked up to operate one of the valves 70, 71.

When the mode selection switch 74 is moved from the illustrated position to the manual position, control relays 90, 91 are picked up and current is supplied to the manual switches 84, 85. Picking up of the relays 90, 91 opens the circuit from the key switch 87 to the up and down relays 80, 82, 81, 83 of the valve 70, 71 so that the relays become ineffective. Movement of the manual switch 84 to either its up or down position energizes the appropriate solenoid for both of the valves 70. Movement of the manual switch 85 to either its up or down position energizes the appropriate solenoid for both of the valves 71. In this way, the operator may directly operate the valve 70, 71 to manually adjust the suspension system.

In summary, the invention provides a method by which a currently uncompensated strut 30, 31 may be modified to yield an increased suspension stroke while preventing the suspension system from bottoming out. The chamber 34 of the strut 30, 31 which contains gas 32 is adapted with an orifice 47 to allow a regulated flow of gas to the gas chamber 44 of an associated accumulator 40, 41. The dimensions of the accumulator gas chamber 44 are determined by the volume of the incompressible fluid or oil in the accumulator oil chamber 43, which is separated from the gas chamber 44 by a floating piston 45 within the accumulator cylinder 40, 41. In order to level the vehicle 20, oil from a source 52 may be added to or removed from the accumulator 40, 41 through a solenoid operated valve 70, 71 and control devices including a pump 61, a pressure control valve 62, and lines 63, 72. Leveling may be achieved automatically or manually, as selected by the operator of the vehicle.

We claim as our invention:

1. A suspension assembly for a vehicle having a chassis and at least one wheel axle comprising, in combination:
   a strut having a first cylinder section and second piston section, said first and second sections being fitted for telescoping movement in relation to each other to form first and second chambers therein, said first strut chamber being filled with a gas, said second strut chamber being filled with a liquid, and a means for separating said chambers;
   a cylinder having a first cylinder chamber filled with a liquid, a second cylinder chamber filled with a gas, and a movable means for separating the chambers within the cylinder;
   a source of liquid under pressure, a first connection from the source of liquid to the first cylinder chamber, and a valve means for controlling the supply of liquid from the source of liquid to the first cylinder chamber to permit adjustment of the volume of liquid in the cylinder;
   a second connection from the second cylinder chamber to the first strut chamber, said second connection including an orifice, the orifice being sized to regulate a flow of gas from the chamber containing gas at a higher pressure to the chamber containing gas at a lower pressure, the gas flow between chambers occurring at a substantially constant rate when the gas pressure in the chamber containing the higher pressure gas exceeds a predetermined value such that the dynamic stiffness characteristic of the strut is a function of the speed of the movement of the axle relative to the vehicle.

2. A suspension assembly according to claim 1 wherein the dynamic stiffness characteristic of the strut varies proportionally to the speed of the movement of the axle relative to the vehicle when the gas pressure in the chamber containing the higher pressure gas exceeds a predetermined value.

3. A suspension assembly according to claim 1 including a sensing means for sensing the relationship of the axle to the vehicle, and wherein said valve means is automatically operable by said sensing means for leveling the vehicle by maintaining the length of said strut substantially constant under varying loadings.

4. A suspension assembly according to claim 3 wherein said valve means is manually operable for raising and lowering the vehicle.

5. A suspension assembly according to claim 1 including sensing means for sensing the relationship of the axle to the vehicle and an electrical circuit connecting said valve means for operation by said sensing means to maintain the length of said strut substantially constant under varying loadings.

6. A suspension assembly according to claim 5 wherein said valve means is manually operable for raising and lowering the vehicle.

7. A suspension assembly for a vehicle having a chassis and at least one wheel axle comprising, in combination:
   a strut interposed between said chassis and said wheel axle, said strut having a first cylinder section and a second piston section, said first and second sections being fitted for telescoping movement in relation to each other to form first and second chambers therein, said first strut chamber being filled with a gas, said second strut chamber being filled with a liquid, and a means for separating said chambers;
   a cylinder having a first cylinder chamber filled with a liquid, a second cylinder chamber filled with a gas, and a movable means for separating the chambers within the cylinder;
   a source of liquid under pressure, a first connection from the source of liquid to the first cylinder chamber, and a valve means for controlling the supply of liquid from the source of liquid to the first cylinder chamber to permit adjustment of the volume of liquid in the cylinder;
   a second connection from the second cylinder chamber to the first strut chamber, said second connection including an orifice, the orifice being sized to regulate a flow of gas between the chambers to control the movement of the axle relative to the vehicle;
   a sensing means for sensing the relationship of the axle to the vehicle;
   said valve means being both manually operable for raising and lowering the vehicle by increasing or decreasing the volume of liquid in the cylinder, and automatically operable by said sensing means for leveling the vehicle by regulating the volume of liquid in the cylinder such that the relative pressure of the gas in the second cylinder chamber and in the strut chamber maintain the length of the strut substantially constant.

8. A suspension assembly according to claim 1 wherein the gas flow between the chambers occurs at a substantially constant rate when the gas pressure in the chamber containing the higher pressure gas exceeds about 15 psig.

* * * * *